United States Patent [19]

Hanei et al.

[11] Patent Number: 4,772,996
[45] Date of Patent: Sep. 20, 1988

[54] LOAD CURRENT DETECTING DEVICE FOR PULSE WIDTH MODULATION INVERTER

[75] Inventors: Hiroyuki Hanei; Takeshi Hanada, both of Chiba; Kenji Kubo, Hitachi; Masahiko Watanabe, Hitachi; Tsutomu Omae, Hitachi; Toshihiko Matsuda, Hitachi, all of Japan

[73] Assignee: Hitachi, Ltd., Tokyo, Japan

[21] Appl. No.: 36,862

[22] Filed: Apr. 9, 1987

[30] Foreign Application Priority Data

Apr. 11, 1986 [JP] Japan .................................. 61-82267
Sep. 22, 1986 [JP] Japan ................................. 61-222163

[51] Int. Cl.$^4$ ......................................... H02M 7/537
[52] U.S. Cl. ........................................ 363/41; 363/98; 363/132; 318/811
[58] Field of Search ..................... 363/39–43, 363/95, 98, 131, 132, 136; 318/800–802, 811–812, 806

[56] References Cited

U.S. PATENT DOCUMENTS

| | | | |
|---|---|---|---|
| 4,546,422 | 10/1985 | Okado | 363/41 |
| 4,597,037 | 6/1986 | Okado | 363/41 |
| 4,617,622 | 10/1986 | Fox | 363/132 X |
| 4,630,187 | 12/1986 | Henze | 363/41 |
| 4,685,042 | 8/1987 | Severinsky | 363/41 |

FOREIGN PATENT DOCUMENTS 0172995 3/1982 Japan .
0198165 5/1982 Japan .
2138957 10/1984 United Kingdom .

Primary Examiner—Patrick R. Salce
Assistant Examiner—Emanuel Todd Voeltz
Attorney, Agent, or Firm—Fay, Sharpe, Beall, Fagan, Minnich & McKee

[57] ABSTRACT

A PWM inverter includes a plurality of arms connected in parallel with a d.c. power source. Each arm is constituted by an upper arm and a lower arm each having a switching element. A plurality of switching control signals are continuously and alternately applied to one and the other of the two switching elements constituting the same arm respectively. In the PWM inverter, shunt resistors are connected between a minus terminal of the d.c. power source and the lower arms respectively. The PWM inverter further comprises a waveform command generating circuit generating commands representative of current waveforms to be supplied to a load, a carrier wave generating circuit and sample-hold circuits. Each of the sample-hold circuits samples and holds a terminal voltage of the associated shunt resistor in synchronism with the period of the carrier wave generated from the carrier wave generating circuit and at specific timing in a conduction period of the associated switching element.

16 Claims, 10 Drawing Sheets

LOAD CURRENT DETECTING DEVICE FOR PULSE WIDTH MODULATION INVERTER

BACKGROUND OF THE INVENTION

1. Field of the Invention

This invention relates to a current detecting device, and more particularly to an inexpensive and small-sized current detecting device suitable for application to a pulse width modulation inverter (referred to hereinafter merely as a PWM inverter) and a control device therefor.

2. Description of the Related Art

In an apparatus such as a PWM inverter which generates a desired output current by switching a d.c. voltage, ripple appears in the output current due to the d.c. voltage switching operation. It is required to detect the output current of the PWM inverter and produce a current signal representing the output current to be used for control of the PWM inverter. However, the current signal may include a ripple component corresponding to the ripple of the output current. A method for reducing this ripple component contained in the current signal is known as disclosed in, for example, Japanese patent laid-open application JP-A No. 58-198165, in which current detection is executed in synchronism with specific timing of a PWM signal on the basis of which the switching operation is carried out. This method utilizes the fact that, when the current is detected in synchronism with the neighborhood of positive and negative peak values of a carrier wave signal used for generating the PWM signal, the detected current value represents a current flowing at a timing corresponding substantially to the middle point of the conduction period or non-conduction period of the individual switching elements constituting the PWM inverter. Since the current value detected with the above timing is free from the adverse effect of ripple, such a current detector is not only effectively applicable to execution of current control according to discrete computation by a microprocessor or the like, but also effectively used as a ripple smoothing filter in an analog current control system.

In JP-A No. 58-198165 cited above, a current detector of isolated type, for example, that using a Hall effect element is employed as means for detecting the actual phase current flowing through each of the individual phases of the PWM inverter.

However, such isolated type current detectors are expensive when compared with shunt resistors or the like commonly used for the purpose of current detection and have a large size when compared with simple resistors. Thus, the size of the PWM inverter including the current detector could not be reduced because of the factors described above.

On the other hand, Japanese patent laid-open application JP-A No. 58-172995 discloses a method in which shunt resistors are connected between lower-side arms of a PWM inverter and a minus terminal of a d.c. power source of the inverter to detect load currents of the inverter.

However, the value of current flowing through each of the shunt resistors does not represent the accurate value of the load current when a switching element in the lower-side arm, to which this shunt resistor is connected, is in its non-conducting state. No solution to this problem is described anywhere in JP-A No. 58-172995 cited above.

The term "lower-side arm" is used, throughout the specification, to indicate the circuit including main switching elements and a fly wheel diode connected between the negative or minus terminal of the d.c. power source and a load, while the term "upper-side arm" is used to indicate the circuit including the main switching elements and the fly wheel diode connected between the positive terminal of the d.c. power source and the load.

SUMMARY OF THE INVENTION

It is therefore an object of the present invention to provide an inexpensive and small-sized current detecting device using shunt resistors as current detectors for a PWM inverter, which device can accurately detect load currents irrespective of whether switching elements are conducting or non-conducting.

In the PWM inverter of the present invention which attains the above object, a shunt resistor for current detection purpose is connected between a switching element disposed in one of two arms in each phase and a minus terminal of a d.c. power source, and a voltage drop across the shunt resistor is detected at timing where the switching element is in its conducting state. This timing corresponds to the time where the switching element connected to the shunt resistor conducts from its non-conducting state in the neighborhood of a positive or negative peak of a carrier wave signal used for generating a PWM signal.

Each phase of the PWM inverter includes an upper arm and a lower arm in each of which a switching element is disposed, and the switching operation of the PWM inverter is achieved by alternately changing over the two switching elements in each phase between a conducting state and a non-conducting state. Therefore, when the switching element in the arm associated with the shunt resistor is in its conducting state, current flowing through this arm is equal to the phase current, and a voltage drop corresponding to the phase current occurs across the shunt resistor. However, when the switching element is in its non-conducting state, the phase current flows through the switching element in the other arm. Therefore, the voltage drop across the shunt resistor is null and does not correspond to the phase current. According to the present invention, a timing signal indicative of substantially the middle point of the conducting period of the switching element connected to the shunt resistor is easily obtained. therefore, when the voltage drop across the shunt resistor is sampled and held by application of this timing signal, the current value representing the phase current can be detected. Further, this detected current value is free from the adverse effect of ripple.

DESCRIPTION OF THE PREFERRED EMBODIMENTS

A preferred embodiment of the PWM inverter according to the present invention will now be described with reference to FIGS. 1 and 2.

Figure 1:
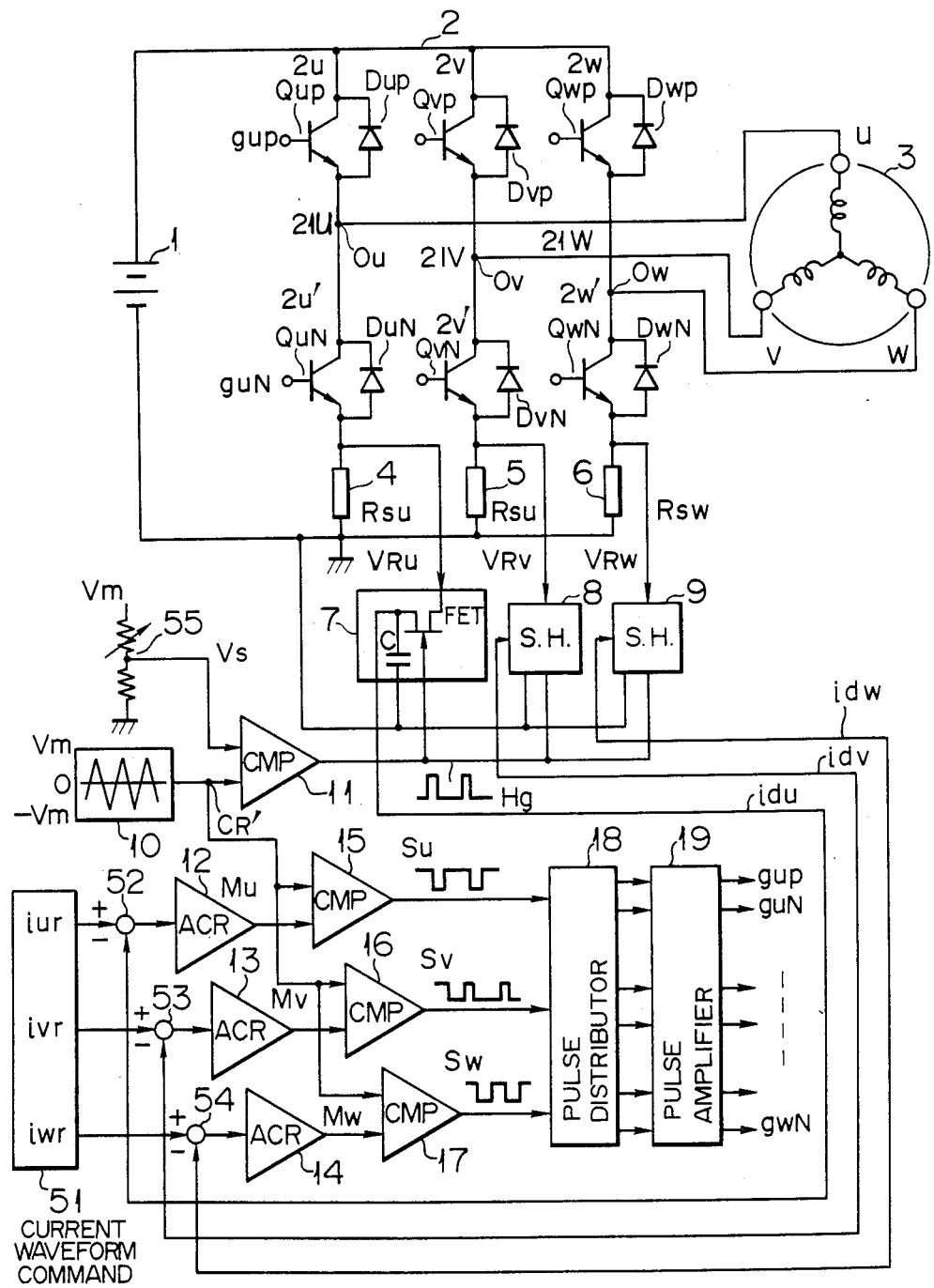
FIG. 1 is a circuit diagram showing the structure of an embodiment of the PWM inverter according to the present invention.

Referring to FIG. 1, the PWM inverter includes a d.c. power source 1 and a main circuit 2 generating a three-phase a.c. output, and a three-phase induction motor 3, which is a load, is connected to inverter a.c. output terminals $O_U$, $O_V$ and $O_W$.

The inverter main circuit 2 is composed of upper arms $2_u$, $2_v$, $2_w$ and lower arms $2_u'$, $2_v'$, $2_w'$. The upper arms $2_u$, $2_v$, $2_w$ and the lower arms $2_u'$, $2_v'$, $2_w'$ include switching elements or transistors $Q_{UP}$, $Q_{VP}$, $Q_{WP}$, $Q_{UN}$, $Q_{VN}$, and flywheel diodes $D_{UP}$, $D_{VP}$, $D_{WP}$, $D_{UN}$, $D_{VN}$, $D_{WN}$ connected in inverse parallel relation with these transistors respectively.

The upper arm $2_u$ is connected in series with the lower arm $2_u'$ to form an arm $21_U$ of U-phase, the upper arm $2_v$ is connected in series with the lower arm $2_v$40 to form an arm $21_V$ of V-phase, and the upper arm $2_w$ is connected in series with the lower arm $2_w'$ to form an arm $21_W$ of W-phase. These three arms $21_U$, $21_V$ and $21_W$ are connected in parallel with each other between a plus terminal and a minus terminal of the d.c. power source 1. Connecting points in series connection between the upper arms $2_u$, $2_v$, $2_w$ and the lower arms $2'$, $2_v'$, $2_w'$ provide the a.c. output terminals $O_u$, $O_v$ and $O_w$ respectively.

Shunt resistors 4, 5 and 6 are connected between the lower arms $2_u'$, $2_v'$, $2_w'$ and the minus terminal of the d.c. power source 1 respectively. Sample-hold circuits 7, 8 and 9 sample and hold terminal voltages $V_{RU}$, $V_{RV}$ and $V_{RW}$ of the shunt resistors 4, 5 and 6 respectively when an output signal $C_R$ of a carrier wave generating circuit 10 exceeds an output signal $V_S$ of a reference value signal generating circuit 55. The sample-hold circuit 7 is composed by connecting a field effect transistor FET and a capacitor C in parallel as shown. The structure of the other sample-hold circuits 8 and 9 is the same as that of the sample-hold circuit 7. A comparing circuit 11 compares the output signal $C_R'$ of the carrier wave generating circuit 10 with the output signal $V_S$ of the reference value signal generating circuit 55 to generate a sampling pulse signal or timing signal $H_g$, when the signal $C_R'$, exceeds in level the signal $V_S$.

A waveform command generating circuit 51 generates current waveform command signals $i_{ur}$, $i_{vr}$ and $i_{wr}$ commanding current waveforms which should appear at the a.c. output terminals $O_u$, $O_v$ and $O_w$ respectively. These current waveform command signals $i_{ur}$, $i_{vr}$ and $i_{wr}$ are sine wave signals which have an electrical phase difference of 120° therebetween. Difference computing circuits 52, 53 and 54 compute differences between the current waveform command signals $i_{ur}$, $i_{vr}$, $i_{wr}$ and output signals $i_{du}$, $i_{dv}$, $i_{dw}$ of the sample-hold circuits 7, 8, 9 for the individual phases respectively. Error amplifiers 12, 13 and 14 amplify output signals of the difference computing circuits 52, 53 and 54 respectively.

Comparators 15, 16 and 17 compare ACR output signals $M_U$, $M_V$ and $M_W$ of the error amplifiers 12, 13 and 14 with the output signal $C_R$ of the carrier wave generating circuit 10 and generate PWM signals $S_U$, $S_V$ and $S_W$ respectively when the output signal $C_R$ of the carrier wave generating circuit 10 exceeds the output signals $M_U$, $M_V$ and $M_W$ of the error amplifiers 12, 13 and 14. A pulse distributing circuit 18 inverts the output signals $S_U$, $S_V$ and $S_W$ of the respective comparators 15, 16 and 17 and generates signals having pulse widths slightly narrower than those of the respective inverted signals and, also, signals having pulse widths slightly narrower than those of the respective signals $S_U$, $S_V$ and $S_W$. A pulse amplifier 19 amplifies the six pulse trains applied from the pulse distributing circuit 18 and generates base or gate signals $g_{UP}$, $g_{UN}$, $g_{VP}$, $g_{VN}$, $g_{WP}$ and $g_{WN}$ which are applied to the switching elements $Q_{UP}$, $Q_{UN}$, $Q_{VP}$, $Q_{VN}$, $Q_{WP}$ and $Q_{WN}$ respectively. Thus, the combination of the comparators 15, 16, 17, the pulse distributing circuit 18 and the pulse amplifier 19 constitutes a switching control circuit in the present embodiment.

The switching elements may be power MOSFET's (metal oxide semiconductor type field effect transistors), GTO's (gate turn-off thyristors) or the like.

In the illustrated embodiment, the shunt resistors 4, 5 and 6 are connected between the respective switching elements $Q_{UN}$, $Q_{VN}$, $Q_{WN}$ in the lower arms and the minus terminal of the d.c. power source 1. This arrangement is convenient when NPN transistors or power MOSFET's are used as the switching elements. This is because gate signals (or base signals) can be set to have a reference potential equal to that of the shunt resistors. On the other hand, when PNP transistors are used as the switching elements, the shunt resistors are to be connected between the upper arms, especially, the switching elements in the upper arms and the plus terminal of the d.c. power source 1.

Figure 2:
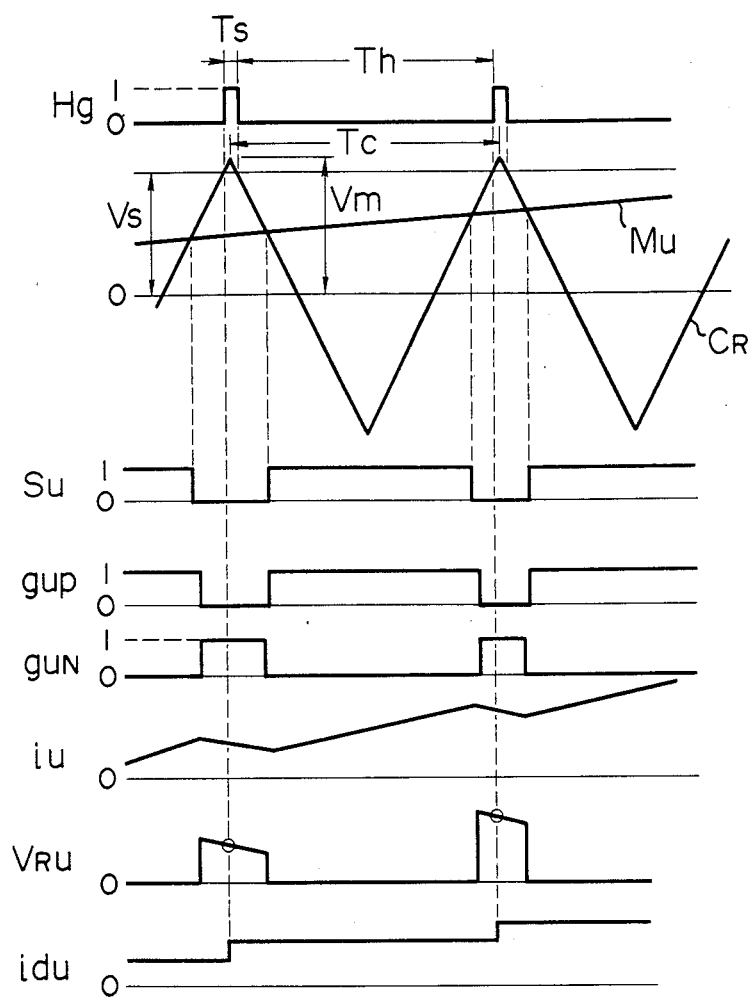
FIG. 2 is a time chart for illustrating the operation of the embodiment shown in FIG. 1.

FIG. 2 shows operating signal waveforms appearing at various parts of the embodiment of the present invention shown in FIG. 1.

Referring to FIG. 2, the carrier wave signal $C_R$ having an amplitude $V_m$ is compared with the voltage level $V_S$ to provide the timing signal $H_g$. This timing signal $H_g$ is a pulse signal whose pulse period is $T_C$ and which is in its "1" level only in the neighborhood of a positive peak of the carrier wave signal $C_R$. $T_C$ designates the period of the carrier wave signal $C_R$, and the voltage level $V_S$ is very close to but smaller than $V_m$, for example $V_S = 0.95 V_m$. On the other hand, the PWM signal $S_U$ of U-phase is produced by comparing the ACR output signal $M_U$ of U-phase (which corresponds to the voltage command value of U-phase) with the carrier wave signal $C_R$ in the comparator 15. This PWM signal $S_U$ is based to produce the gate signals $g_{UP}$ and $g_{UN}$ used for turning on/off the respective power transistors $Q_{UP}$ and $Q_{UN}$ in the U-phase arm $21_U$. The "0" level and "1" level of the gate signals $g_{UP}$ and $g_{UN}$ correspond to the off-state and on state of the power transistors $Q_{UP}$ and $Q_{UN}$ respectively. With the switching operation of these power transistors $QU_P$ and $Q_{UN}$, a phase current $i_U$ of U-phase including ripple flows.

When the phase current $i_u$ is positive, and the gate signal $g_{UP}$ is in its "1" level, the power transistor $Q_{UP}$ in the upper arm is turned on, and current is supplied from the plus terminal of the d.c. power source 1 in the positive direction. Then, when the gate signal $g_{UP}$ is turned into its "0" level, the power transistor $Q_{UP}$ is turned off, and the gate signal $g_{UN}$ is now turned into its "1" level. Whether the power transistor $Q_{UN}$ can be or cannot be turned on is dependent upon its collector potential. In the former case, the U-phase potential is conducted to the minus terminal of the d.c. power source 1, and the phase current flows through the d.c. power source 1. On the other hand, in the latter case, the phase current flows through the flywheel diode $D_{UN}$. In each of these two cases, however, the phase current that flows when the gate signal $g_{UN}$ is in its "1" level coincides with or equal to the current which flows through either the power transistor $Q_{UN}$ or the flywheel diode $D_{UN}$. This relation also holds even when the phase current $i_u$ is negative.

Therefore, when the shunt resistor 4 is connected in the lower arm $2_u'$ of U-phase as shown in FIG. 1, the voltage dro $V_{RU}$ across this shunt resistor 4, when the gate signal $g_{UN}$ is in its "1" level, corresponds always to the phase current $i_U$ of U-phase. Also, when the gate signal $g_{UN}$ is in its "0" level, the phase current $i_U$ flows through the power transistor $Q_{UP}$ in the upper arm $2_u$ or through the flywheel diode $D_{UP}$, and the voltage drop $V_{RU}$ across the shunt resistor 4 is null. As also described in JP-A No. 58-198165 cited already, the timing signal Hg produced by the aforementioned means is a pulse signal whose period is $T_C$ and which takes its "1" level for a period of time $T_S$ at about the middle point of the "1" level period of the gate signal $g_{UN}$. Therefore, when the voltage $V_{RU}$ across the shunt resistor 4 is sampled in the "1" level period of the timing signal Hg and held in the remaining period (the "0" level period of the timing signal Hg), and the output current of the sample-hold circuit 7 is detected, the detected current value $i_{du}$ coincides always with the phase current $i_U$ irrespective of whether the phase current $i_U$ flows through the power transistor $Q_{UN}$ in the lower arm $2_u'$ or through the flywheel diode $D_{UN}$. Further, the detected current value $i_{du}$ is free from a ripple component. The "1" level period $T_S$ of the timing signal Hg can be adjusted by changing the voltage level $V_S$ and is selected to be as short as possible, but longer than the period of time required for sampling by the sample-hold circuit 7. The same applies to the other phases.

It will be seen from the detailed description of the first embodiment of the present invention that a timing signal for sampleing a voltage appearing across a shunt resistor in each phase can be produced by a relatively simple circuit, so that an inexpensive current detecting device including a signal processing circuit can be provided.

Figure 3:
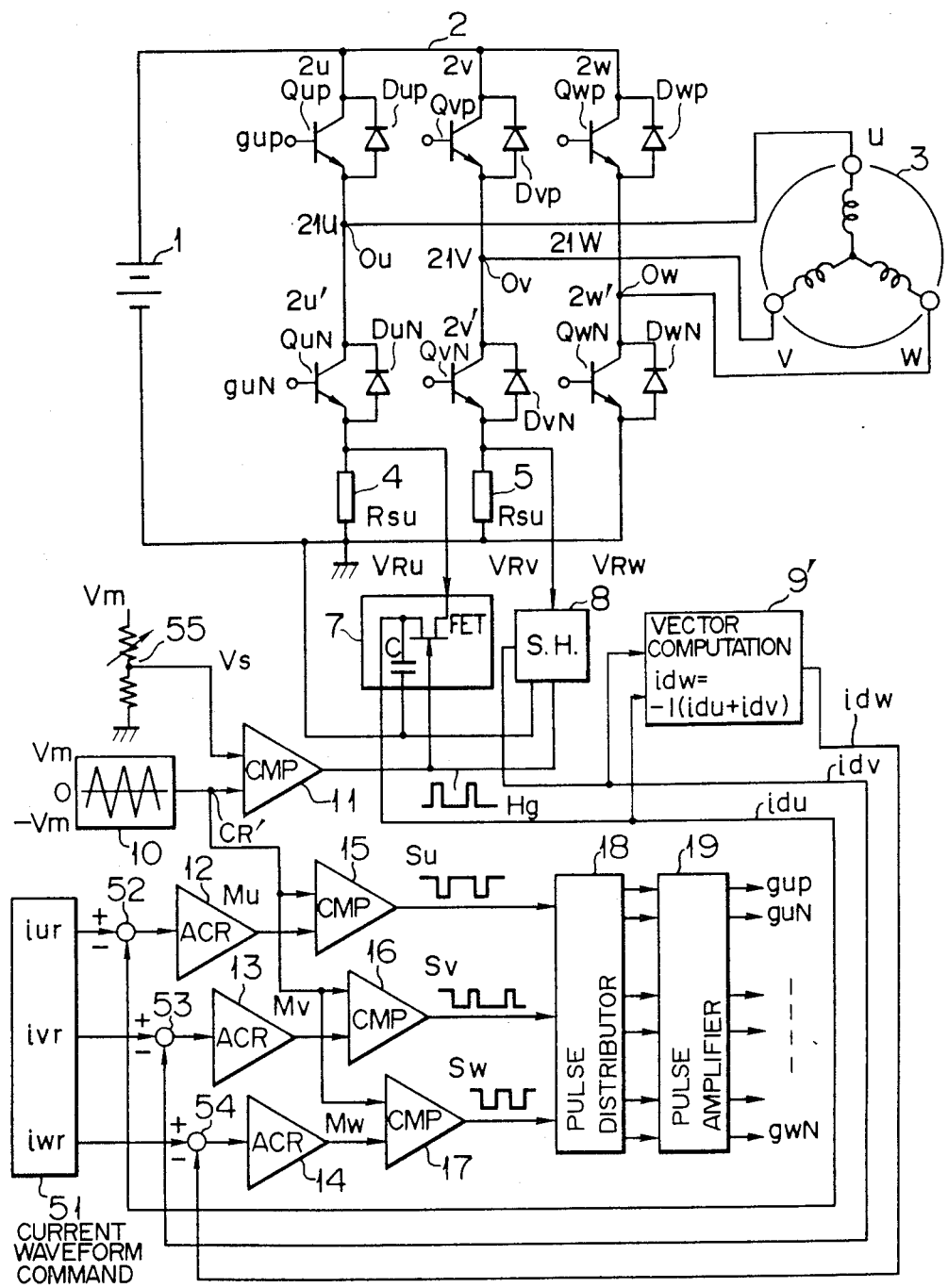
FIG. 3 is a circuit diagram showing the structure of another embodiment of the present invention.

A second embodiment of the present invention will be described with reference to FIG. 3. This second embodiment is a modification of the first embodiment shown in FIG. 1 in that the shunt resistor $R_{SW}$ and the sample-hold circuit 9 are eliminated, and, in lieu of them, a vector computing circuit 9' is provided. This vector computing circuit 9' receives vector outputs $\vec{i}_{du}$ and $\vec{i}_{dv}$ of the respective sample-hold circuits 7, 8 and computes $\vec{i}_{dw} = -1 \times (\vec{i}_{du} + \vec{i}_{dv})$.

Figure 4:
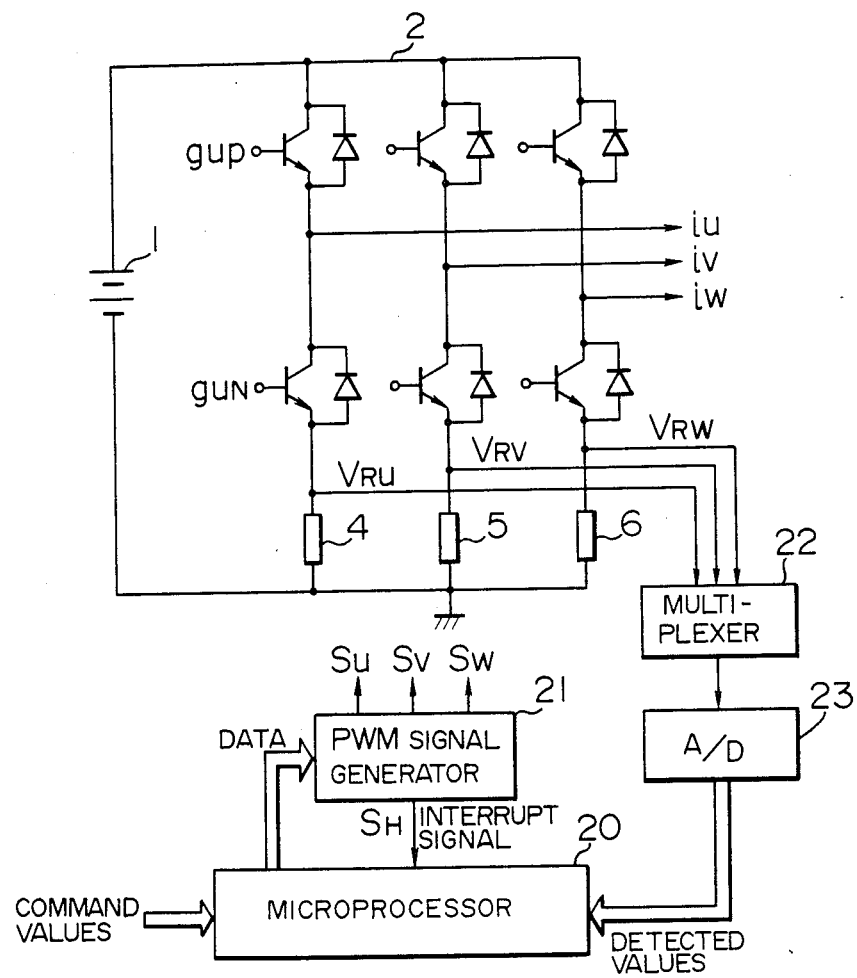
FIG. 4 is a block diagram showing the structure of still another embodiment of the present invention.

A third embodiment of the present invention is shown in FIG. 4. In FIG. 4, reference numerals 20. 21, 22 and 23 designate a microprocessor, a PWM signal generator, a multiplexer, and an A/D converter respectively, and the same reference numerals are used to designate the same parts appearing in FIG. 1.

In the first embodiment, a current detecting circuit suitable for constituting an analog current control circuit has been described. This third embodiment includes a current control system suitable for current control by a discrete arithmetic and logic element such as a microprocessor.

Referring to FIG. 4, the PWM signal generator 21 generates a timing signal $S_H$ which is applied as an interrupt signal to the microprocessor 20. In response to the leading edge of the timing signal $S_H$ applied to the microprocessor 20, an interrupt processing routine is run, and analog voltages appearing across the shunt resistors 4, 5 and 6 of individual phases are converted into digital quantities respectively. (In this case, the potential at the minus terminal of the d.c. power source 1 is taken as a reference potential.) That is, detected analog voltages $V_{Ru}$, $V_{RV}$ and $V_{RW}$ across the shunt resistors 4, 5 and 6 are sequentially selected by the multiplexer 22 and are converted into corresponding digital data respectively by the A/D (analog to digital) converter 23. Such detected digital data are supplied to the microprocessor 20 together with separately prepared current command values. On the basis of the above values supplied thereto, the microprocessor 20 executes necessary computation for the purpose of current control, and data obtained as a result of the computation are supplied to the PWM signal generator 21. In the PWM signal generator 21, PWM signals $S_U$, $S_V$ and $S_W$ of individual phases are produced on the basis of the newest data supplied from the microprocessor 20 to achieve the desired current control.

Figure 5:
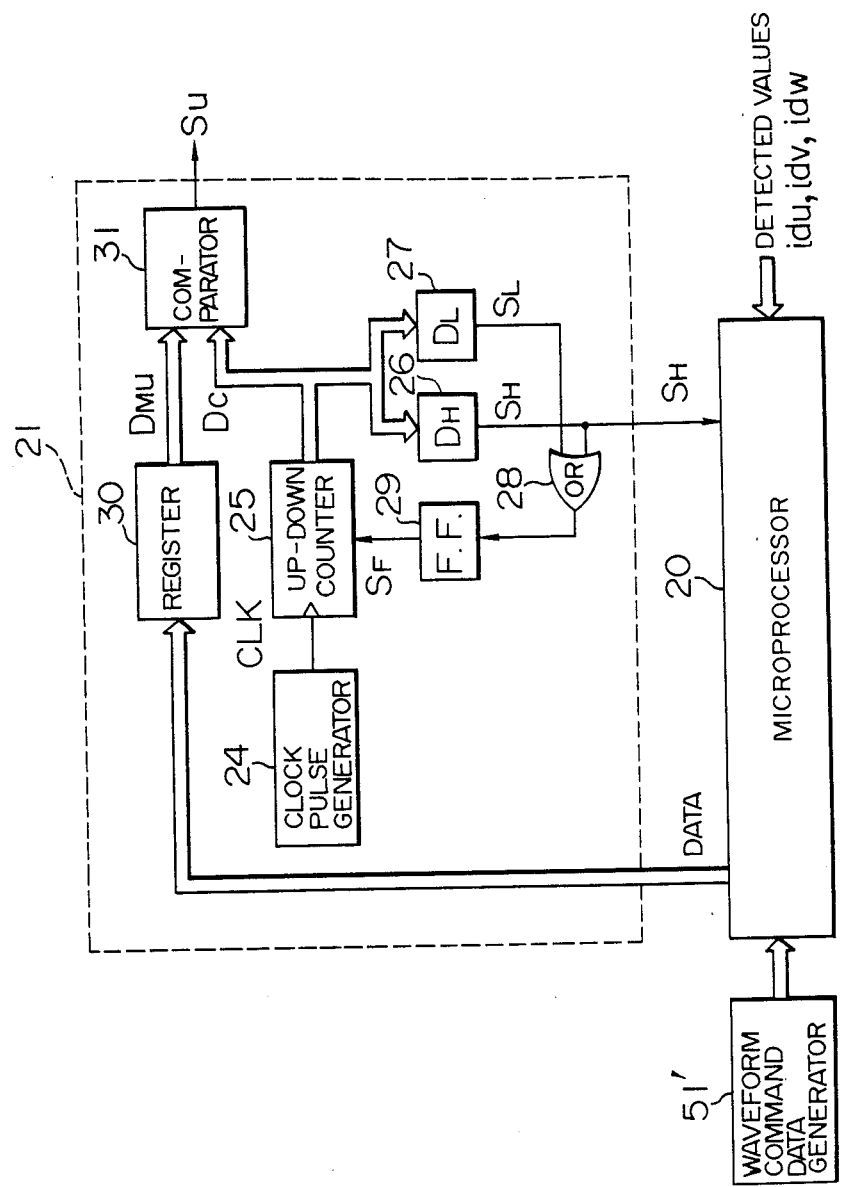
FIG. 5 is a block diagram showing in further detail the structure of part of the embodiment shown in FIG. 4.

FIG. 5 shows in detail the structure of the PWM signal generator 21 shown in FIG. 4. Referring to FIG. 5, the PWM signal generator 21 includes a clock pulse generator 24, an up-down counter 25, a maximum value discrimination circuit $D_H$ 26, a minimum value discrimination circuit $D_L$ 27, an OR circuit 28, a flip-flop 29, a register 30 and a comparator 31. In FIG. 5, the microprocessor 20 is also shown.

In the structure of the PWM signal generator 1 shown in FIG. 5, the elements belonging to the U-phase are only shown to avoid confusion of illustration. The up-down counter 25, which acts as a carrier wave data generating part, counts clock pulses CLK generated from the clock pulse generator 24 to generate a carrier wave data $D_C$ for producing the PWM signal $S_U$. The combination of the discrimination circuits 26, 27, the OR circuit 28 and the flip-flop 29 is provided for changing over the counting direction (up counting/down counting) of the up-down counter 25. The carrier wave data $D_C$ thus obtained is compared in the comparator 31 with a U-phase modulation data $D_{MU}$ registered in the register 30 from the microprocessor 20 to produce the U-phase PWM signal $S_U$. (The data $D_{MU}$ is provided as a result of the computation for the current control.) Although the U-phase PWM signal $S_U$ is only shown in FIG. 5, it is apparent that the V-phase and W-phase PWM signals $S_V$ and $S_W$ are similarly produced on the basis of the same carrier wave data $D_C$. A signal $S_H$ used for changing over the up counting operation of the up-down counter 25 to the down counting operation is also used as the current detection timing signal applied to the microrocessor 20. That is, the discrimination circuits 26 and 27 act as a reference data generating part. A waveform command data generating part 51' generates digital data corresponding to the current waveform command signals $i_{ur}$, $i_{vr}$ and $i_{wr}$ shown in FIG. 1.

The operation of the PWM signal generator 21 shown in FIG. 5 will be described with reference to FIG. 6 which is an operating waveform diagram.

Figure 6:
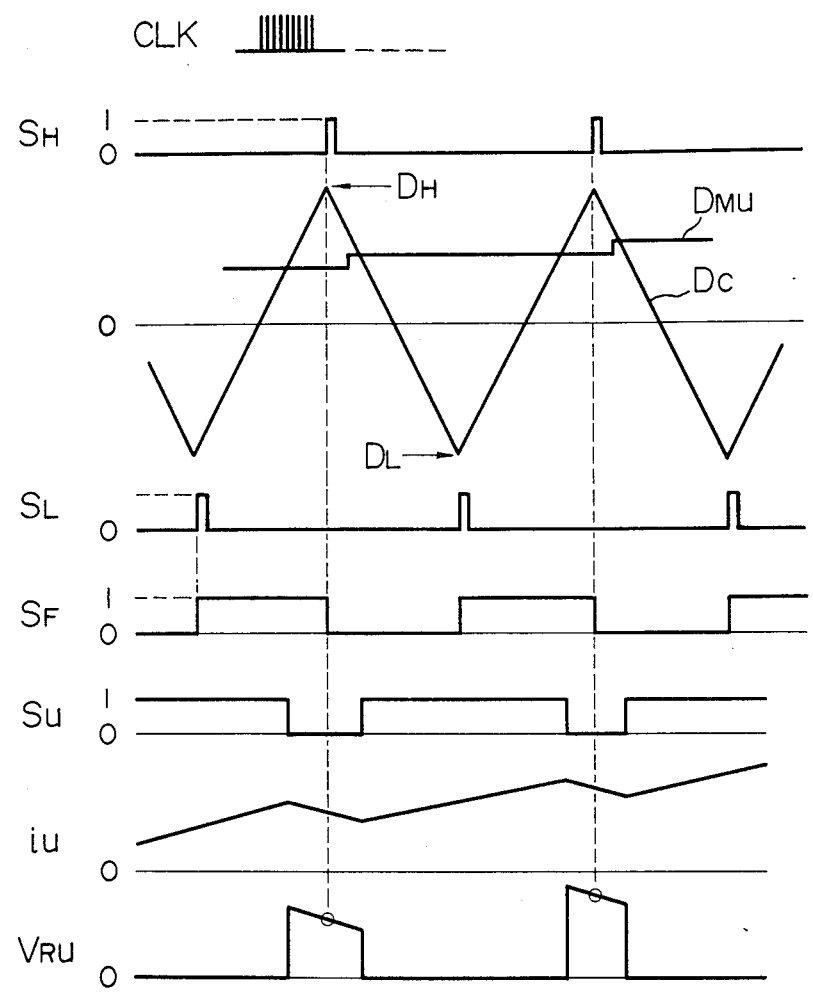
FIG. 6 is a time chart for illustrating the operation of the embodiment shown in FIGS. 4 and 5.

Referring to FIGS. 5 and 6, the count $D_C$ of the up-down counter 25 is compared with data of a positive maximum $D_H$ discriminated by the maximum value discrimination circuit 26 and with data of a negative maximum value $D_L$ discriminated by the minimum value discrimination circuit 27, and, as a result of comparison, a carry signal $S_H$ or a borrow signal $S_L$ appears from the discrimination circuit 26 or 27 depending on the value of the data $D_C$. As shown in FIG. 6, the signals $S_H$ and $S_L$ are produced at the same period of cycle, but deviated from each other by a half cycle. The carry signal $S_H$ or the borrow signal $S_L$ is applied through the OR circuit 28 to the flip-flop 29 to change over the state of the flip-flop 29, and a signal $S_F$ indicative of the counting direction of the up-down counter 25 appears from the flip-flop 29. When now the up-down counter 25 is designed to count down and up in the "0" and "1" levels respectively of the signal $S_F$, the count output of the up-down counter 25 provides the desired carrier wave data $D_C$. The carry signal $S_H$ is generated in synchronism with the positive peak of the carrier wave signal. Therefore, when the voltage $V_{RU}$ appearing across the shunt resistor 4 is detected at the timing of the signal $S_H$, the detected current value $i_{du}$ corresponds always to the phase current $i_U$ and is free from the adverse effect of ripple, as described in the case of the first embodiment. That is, the microprocessor 20 acts as a sample-hold circuit.

In the third embodiment of the present invention, the voltage $V_{RU}$ appearing across the shunt resistor 4 is detected at the timing of the positive peak of the carrier wave signal applied for producing the PWM signal. However, it is apparent that a current value corresponding to the phase current can be similarly detected even when the above timing may be shifted from the time of the positive peak of the carrier wave signal within a range shorter than the minimum pulse width of the PWM signal.

It will be seen from the detailed description of the third embodiment that a current detecting device is provided in which shunt resistors and a discrete computing element such as a microprocessor are used for current control.

Figure 7:
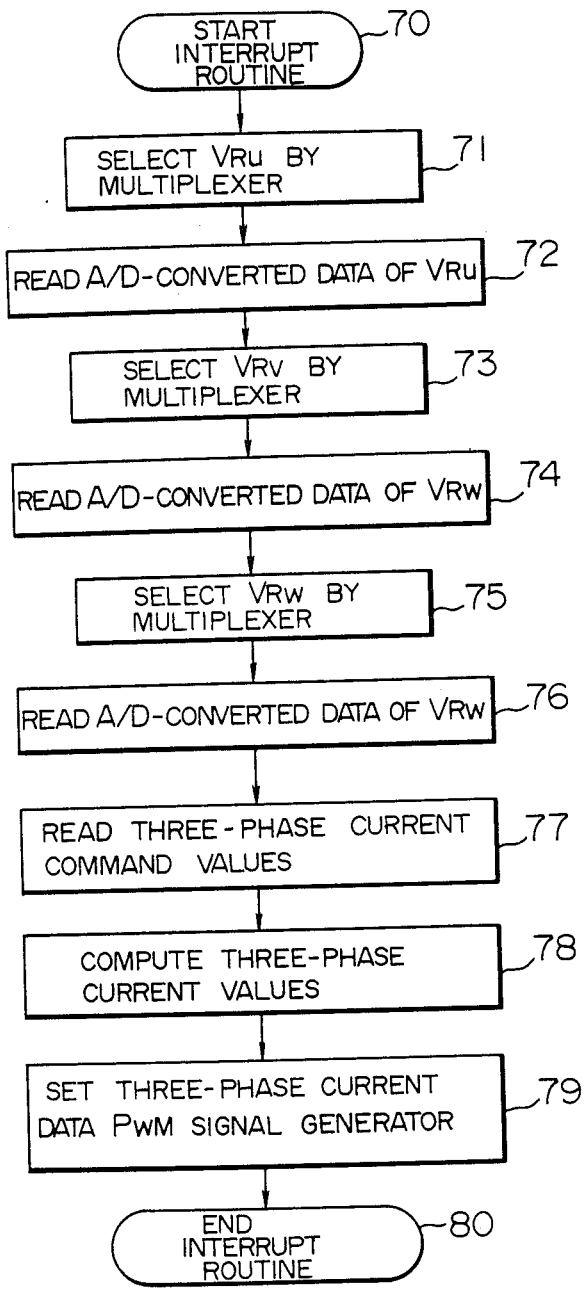
FIGS. 7, 8 and 9 are a flow chart of the operation of the embodiment shown in FIG. 4.
Figure 8:
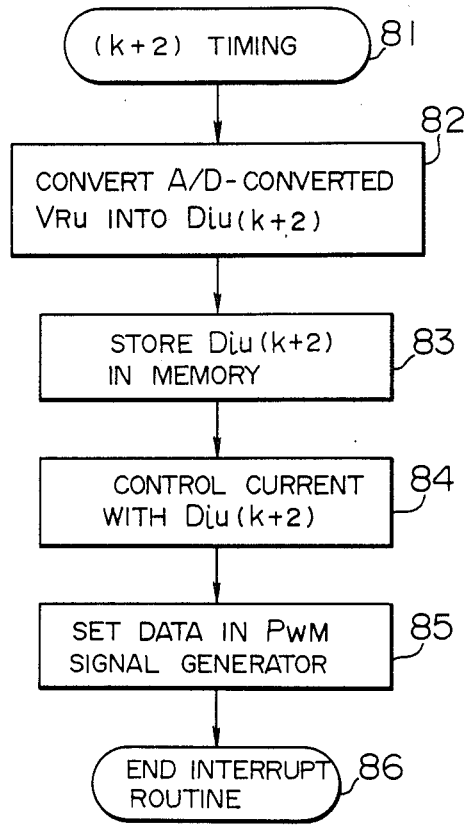
Figure 9:
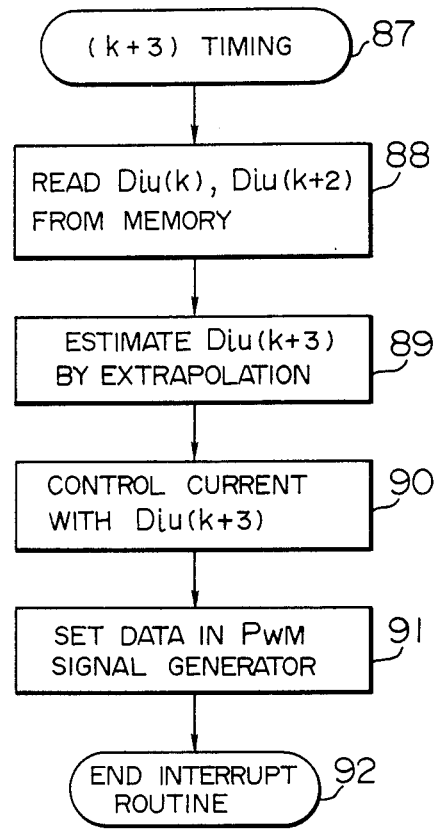

FIGS. 7 to 9 are flow charts of the operation of the third embodiment described with reference to FIGS. 4 to 6.

Figure 10:
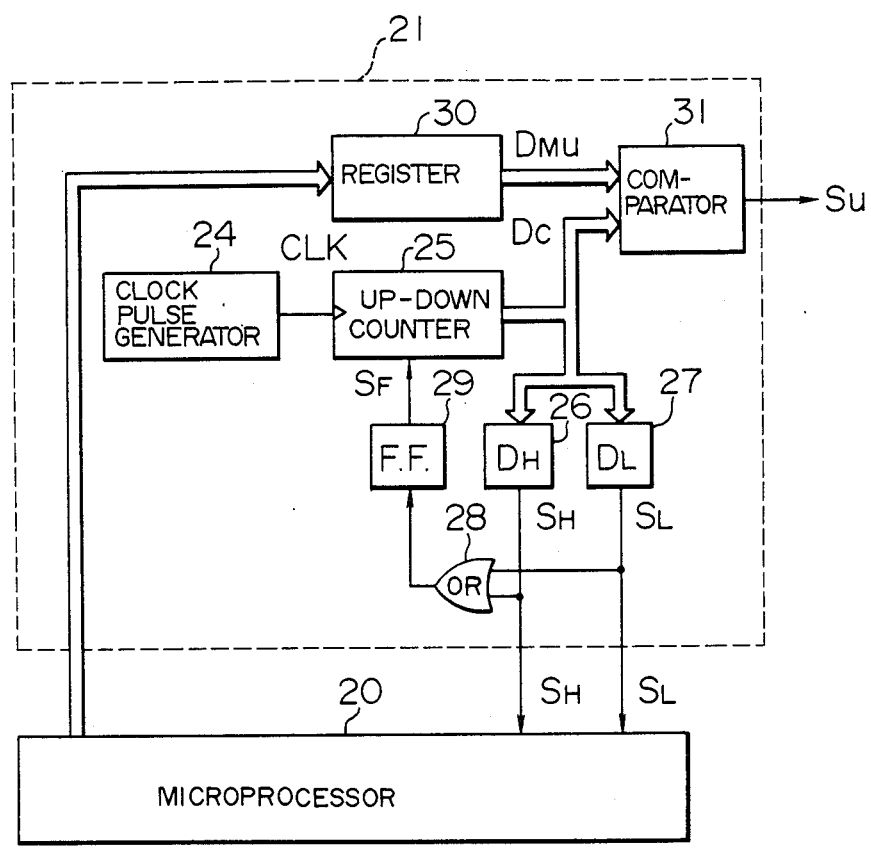
FIG. 10 is a block diagram showing the structure of yet another embodiment of the present invention.

FIG. 10 shows the structure of a PWM signal generator preferably used in a fourth embodiment of the present invention.

Referring to FIG. 10, the PWM signal generator 21 includes a clock pulse generator 24, an up-down counter 25, discrimination circuits 26, 27, an OR circuit 28, a flip-flop 29, a register 30 and a comparator 31. A microprocessor 20 is associated with the PWM signal generator 21.

In the aforementioned third embodiment, a voltage appearing across the shunt resistor in each phase is detected at the timing of the positive peak of the carrier wave signal to detect each phase current in the PWM inverter. In FIG. 10, a current value which will be detected between one detection timing and the next detection timing is extrapolated on the basis of the previously detected value, so that it is used as a presently detected current value.

The structure of the PWM signal generator 21 shown in FIG. 10 is the same as that shown in FIG. 5, except that the borrow signal $S_L$ is also applied to the microprocessor 20 as an interrupt signal in addition to the carry signal $S_H$.

Figure 11:
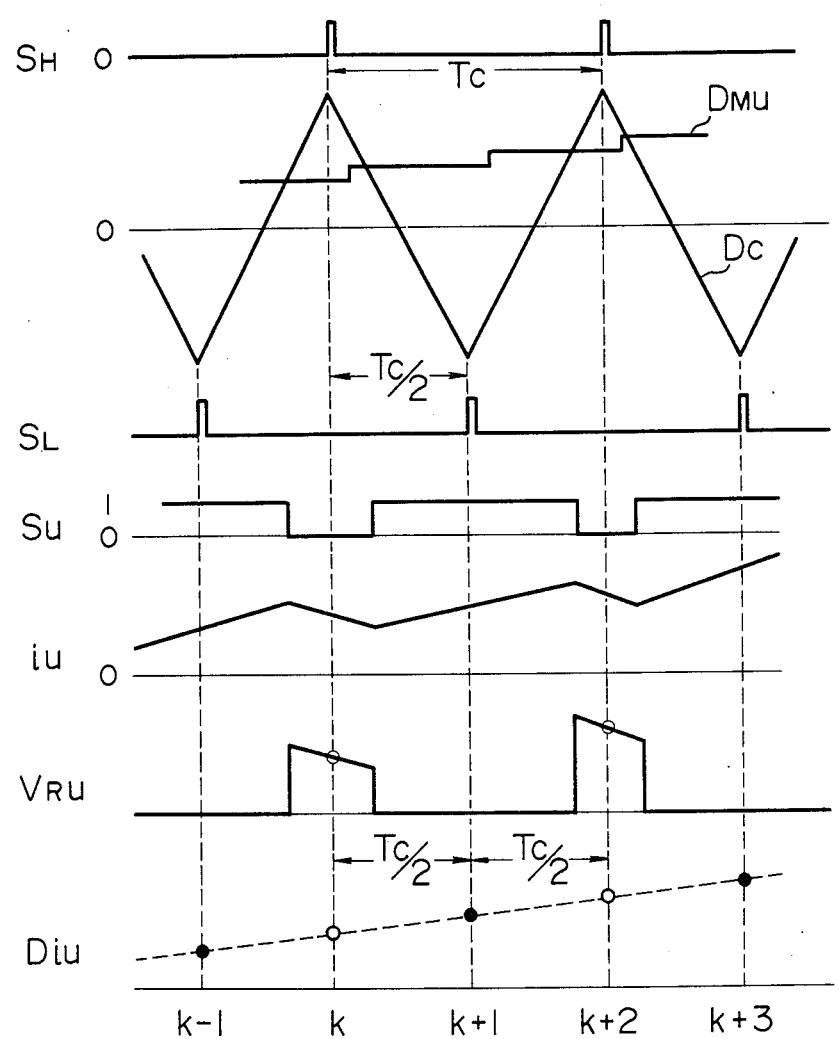
FIG. 11 is a time chart for illustrating the operation of the embodiment shown in FIG. 10.

The operation of the PWM signal generator 21 will be described with reference to FIG. 11 which is an operating waveform diagram. Referring to FIGS. 10 and 11, an analog voltage $V_{RU}$ appearing across a shunt resistor 4 is converted into a corresponding digital data $D_{iu}$, and this data $D_{iu}$ is fetched by the microprocessor 20 in synchronism with the carry signal $S_H$ whose period is the same as the period $T_C$ of the carrier wave signal. The white dots in FIG. 10 indicate such data. In addition to the interruption by the carry signal $S_H$, an interruption is applied to the microprocessor 20 at the timing of the borrow signal $S_L$ whose phase is displaced by $T_{C/2}$ from that of the carry signal $S_H$. At this timing, an accurate current value cannot be detected from the voltage appearing across the shunt resistor. Therefore, data detected past in synchronism with the carry signal $S_H$ are stored, and, by making extrapolation on the stored data, current values which will be detected at the timing of the borrow signal $S_L$ are estimated. The black dots in FIG. 10 indicate such values. The symbols $k-1$, $k$, $k+1$, $k+2$ and $k+3$ in FIG. 10 designate the timings of current detection. A current value $D_{iu}(k+3)$ detected at the timing $(k+3)$ is computed according to the following equation (1):

$$D_{iu}(k+3) = 3/2\, D_{iu}(k) - \tfrac{1}{2} D_{iu}(k+2) \qquad (1)$$

The equation (1) used for the extrapolation is a linear one. This is because the frequency of the carrier wave signal providing the PWM signal is selected to be sufficiently higher than that of the current value command signal in the normal operating range of the PWM inverter, so that it can be assumed that the current values which will be detected between the timings of current detection according to the carry signal $S_H$ change linearly. It is apparent that extrapolation of second or higher order using previously detected data can be utilized to improve the accuracy of extrapolation.

It will be seen from the foregoing detailed description that the fourth embodiment is advantageous in that the response of the current control system can be improved since the period of sampling for the purpose of current detection can be equivalently shortened.

What we claim is:

1. A current detecting device for a PWM inverter including a plurality of arms connected in parallel with a d.c. power source and each including a series connection of two switching elements, a.c. output terminals each being provided by the connection point between the two switching elements constituting each of said arms, and a PWM switching control circuit continuously and alternately applying a plurality of switching control signals to one and the other of said two switching elements constituting each of said arms respectively, said current detecting device comprising:

shunt resistors connected between said d.c. power source and one of said two switching elements constituting each of said arms respectively; and sample-hold means associated with said shunt resistors connected in series with one of said switching elements belonging to the associated arms respectively, each of said sample-hold means providing output signals corresponding to output currents of said a.c. output terminals by sampling and holding a voltage appearing across the associated shunt resistor at specific timing in a conduction period of said switching element belonging to the associated arm.

2. A current detecting device for a PWM inverter including three arms connected in parallel with a d.c. power source and each including a series connection of two switching elements, a.c. output terminals each being provided by the connection point between the two switching elements constituting each of said arms, and a PWM switching control circuit continuously and alternately applying a plurality of switching control signals to one and the other of said two switching elements constituting each of said arms respectively, said current detecting device comprising:

two shunt resistors connected between said d.c. power source and one of said switching elements constituting each of the two arms among said three arms respectively;

two sample-hold means associated with said shunt resistors connected in series with one of said switching elements belonging to the associated arms respectively, each of said sample-hold means for providing output signals corresponding to output currents of a.c. output terminals of said two arms by sampling and holding a voltage appearing across the associated shunt resistor at specific timing in a conduction period of said switching element belonging to the associated arm; and vector computing means for computing on the basis of said output signals from said two sample-hold means, a value by multiplying the sum of vector outputs of said two sample-hold means by $-1$.

3. A current detecting device for a PWM inverter including a plurality of arms connected in parallel with a d.c. power source and each including a series connection of an upper arm and a lower arm each having a switching element, a.c. output terminals each being provided by the connection point between said upper and lower arms constituting each of said arms respectively, and a PWM switching control circuit continuously and alternately applying a plurality of switching control signals to said upper and lower arms constituting each of arms respectively, said current detecting device comprising:

shunt resistors connected between a minus terminal of said d.c. power source and said lower arms respectively; and sample-hold means associated with said shunt resistors connected in series with said lower arms belonging to the associated arms respectively, each of said sample-hold means providing output signals corresponding to output currents of said a.c. output terminals by sampling and holding a voltage appearing across the associated shunt resistor at specific timing in a conduction period of said lower arm.

4. A current detecting device for a PWM inverter including a plurality of arms connected in parallel with a d.c. power source and each including a series connection of an upper arm and a lower arm each having a switching element, a.c. output terminals each being provided by the connection point between said upper and lower arms constituting each of said arms respectively, and a PWM switching control circuit continuously and alternately applying a plurality of switching control signals to one and the other of said switching elements constituting each of said arms respectively, said current detecting device comprising:

shunt resistors connected between said d.c. power source and one of said switching elements constituting each of said arms respectively; and extrapolating means for providing output signals corresponding to output currents of said a.c. output terminals by estimating, through extrapolation, the voltage values which will be held next by said sample-hold means on the basis of time-series data of voltages appearing across said shunt resistors and held by said sample-hold means in the past respectively.

5. A PWM inverter including a plurality of arms connected in parallel with a d.c. power source and each including a series connection of an upper arm and a lower arm each having a switching element, a.c. output terminals each being provided by the connection point between said upper and lower arms constituting each of said arms respectively, and means for continuously and alternately applying a plurality of switching control signals to said upper and lower arms constituting each of said arms respectively, said PWM inverter comprising:

waveform command generating means generating command signals commanding current waveforms to be supplied from said a.c. output terminals;

carrier wave generating means generating a carrier wave signal;

shunt resistors connected between said d.c. power source and one of said switching elements constituting each of said arms respectively;

sample-hold means associated with said shunt resistors connected in series with one of said switching elements belonging to the associated arms respectively, each of said sample-hold means sampling and holding a voltage appearing across the associated shunt resistor in synchronism with the output of said carrier wave generating means and at specific timing in a conduction period of said switching element belonging to the associated arm;

difference computing means computing differences between the outputs of said waveform command generating means and the outputs of said sample-hold means respectively; and switching control means comparing the outputs of said difference computing means with the output of said carrier wave generating means to produce said switching control signals for switching said switching elements.

6. A PWM inverter according to claim 5, wherein said sample-hold means have associated therewith reference signal generating means generating a signal representative of a reference level and comparing means comparing the output of said carrier wave generating means with the output of said reference signal generating means, and each of said sample-hold means samples and holds the terminal voltage of said shunt resistor when the output of said carrier wave generating means becomes larger than the output of said reference signal generating means.

7. A PWM inverter according to claim 5, wherein said sample-hold means have associated therewith reference signal generating means generating a signal representative of a reference level and comparing means comparing the output of said carrier wave generating means with the output of said reference signal generating means, and each of said sample-hold means samples and holds the terminal voltage of said shunt resistor when the output of said carrier wave generating means becomes smaller than the output of said reference signal generating means.

8. A PWM inverter according to claim 5, wherein said sample-hold means have associated therewith reference signal generating means generating a signal representative of a reference level and comparing means comparing the output of said carrier wave generating means with the output of said reference signal generating means, and each of said sample-hold means samples and holds the terminal voltage of said shunt resistor when the absolute value of the output of said carrier wave generating means becomes larger than the output of said reference signal generating means.

9. A PWM inverter according to claim 5, wherein each of said sample-hold means includes a field effect transistor and a capacitor.

10. A PWM inverter including a plurality of arms connected in parallel with a d.c. power source and each including a series connection of an upper arm and a lower arm each having a switching element, a.c. output terminals each being provided by the connection point between said two switching elements constituting each of said arms respectively, and means for continuously and alternately applying a plurality of switching control signals to said upper and lower arms constituting each of said arms respectively, said PWM inverter comprising:
- waveform command data generating means generating data representative of current waveforms to be supplied from said a.c. output terminals;
- carrier wave data generating means generating data representative of carrier wave at a predetermined time interval;
- shunt resistors connected between said d.c. power source and one of said two switching elements constituting each of said arms respectively;
- sample-hold means associated with said shunt resistors connected in series with one of said switching elements belonging to the associated arms respectively, each of said sample-hold means sampling and holding a voltage appearing across the associated shunt resistor in synchronism with the period of said carrier wave data generated from said carrier wave data generating means and at specific timing in a conduction period of said switching element belonging to the associated arm;
- difference computing means computing differences between the outputs of said waveform command data generating means and the outputs of said sample-hold means respectively; and
- switching control means comparing the outputs of said difference computing means with the output of said carrier wave data generating means to produce said switching control signals for switching said switching elements.

11. A PWM inverter according to claim 10, wherein said sample-hold means have associated therewith reference data generating means generating data of a reference level and comparing means comparing the output of said carrier wave data generating means with the output of said reference data generating means, and each of said sample-hold means samples and holds the terminal voltage of said shunt resistor when the output of said carrier wave data generating means becomes smaller than the output of said reference data generating means.

12. A PWM inverter according to claim 10, wherein said sample-hold means have associated therewith reference data generating means generating data of a reference level and comparing means comparing the output of said carrier wave data generating means with the output of said reference data generating means, and each of said sample-hold means samples and holds the terminal voltage of said shunt resistor when the absolute value of the output of said carrier wave generating means becomes larger than the output of said reference data generating means.

13. A PWM inverter according to claim 10, wherein said sample-hold means have associated therewith reference data generating means generating data of a reference level and comparing means comparing the output of said carrier wave data generating means with the output of said reference data generating means, and each of said sample-hold means samples and holds the terminal voltage of said shunt resistor when the output of said carrier wave data generating means becomes larger than the output of said reference data generating means.

14. A PWM inverter including three arms connected in parallel with a d.c. power source and each including a series connection of an upper arm and a lower arm each having a switching element, a.c. output terminals each being provided by the connection point between said two switching elements constituting each of said arms respectively, and means for continuously and alternately applying a plurality of switching control signals to one and the other of said two switching elements constituting each of said arms respectively, said PWM inverter comprising:
- waveform command data generating means generating data representative of current waveforms to be supplied from said a.c. output terminals;
- carrier wave data generating means generating data representative of carrier wave at a predetermined time interval;
- two shunt resistors connected between said d.c. power source and one of said two switching elements constituting each of the two arms among said three arms respectively;
- two sample-hold means associated with said shunt resistors connected in series with one of said switching elements belonging to the associated arms respectively, each of said sample-hold means sampling and holding a voltage appearing across the associated shunt resistor in synchronism with the period of the carrier wave data generated from said carrier wave data generating means and at specific timing in a conduction period of said switching element belonging to the associated arm;
- vector computing means computing a value obtained by multiplying the sum of vector outputs of said two sample-hold means by $-1$;
- difference computing means computing differences between the two outputs of said waveform command data generating means and the outputs of said sample-hold means and between the remaining output of said waveform command data generating means and the output of said vector computing means respectively; and
- switching control means comparing the outputs of said difference computing means with the output of said carrier wave data generating means to produce said switching control signals for switching said switching elements.

15. A PWM inverter according to claim 14, wherein said shunt resistors are connected between a minus terminal of said d.c. power source and said lower arms respectively.

16. A PWM inverter including three arms connected in parallel with a d.c. power source and each including a series connection of an upper arm and a lower arm each having a switching element, a.c. output terminals each being provided by the connection point between said two switching elements constituting each of said arms respectively, and means for continuously and alternately applying a plurality of switching control signals to one and the other of said two switching elements constituting each of said arms respectively, said PWM inverter comprising:

waveform command data generating means generating data representative of current waveforms to be supplied from said a.c. output terminals;

carrier wave data generating means generating data representative of carrier wave at a predetermined time interval;

two shunt resistors connected between said d.c. power source and one of said two switching elements constituting each of the two arms among said three arms respectively;

two sample-hold means associated with said shunt resistors connected in series with one of said switching elements belonging to the associated arms respectively, each of said sample-hold means sampling and holding a voltage appearing across the associated shunt resistor in synchronism with the period of the carrier wave data generated from said carrier wave data generating means and at specific timing in a conduction period of said switching element belonging to the associated arm;

vector computing means computing a value obtained by multiplying the sum of vector outputs of said two sample-hold means by $-1$;

extrapolating means estimating, by extrapolation, the values which will be held next by said sample-hold means on the basis of time-series data of voltages appearing across said shunt resistors and held by said sample-hold means in the past respectively;

difference computing means computing differences between the outputs of said extrapolating means and the outputs of said sample-hold means respectively; and switching control means comparing the outputs of said difference computing means with the output of said carrier wave data generating means to produce said switching control signals for switching said switching elements.

* * * * *